United States Patent
Uemura

(10) Patent No.: US 8,015,874 B2
(45) Date of Patent: Sep. 13, 2011

(54) INERTIA FORCE SENSOR

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 488 days.

(21) Appl. No.: 12/281,205

(22) PCT Filed: Mar. 26, 2007

(86) PCT No.: PCT/JP2007/056153
§ 371 (c)(1),
(2), (4) Date: Aug. 29, 2008

(87) PCT Pub. No.: WO2007/114092
PCT Pub. Date: Oct. 11, 2007

(65) Prior Publication Data
US 2009/0007663 A1   Jan. 8, 2009

(30) Foreign Application Priority Data

Mar. 27, 2006   (JP) ................................ 2006-084577

(51) Int. Cl.
*G01P 9/04* (2006.01)
*G01C 19/56* (2006.01)

(52) U.S. Cl. .................. 73/504.12; 73/504.16

(58) Field of Classification Search ............... 73/504.12, 73/504.15, 504.16, 504.04
See application file for complete search history.

(56) References Cited

U.S. PATENT DOCUMENTS

| | | | | |
|---|---|---|---|---|
| 4,752,053 A | * | 6/1988 | Boetzkes ................... | 246/167 R |
| 5,304,963 A | * | 4/1994 | Shinjo ...................... | 333/172 |
| 5,621,174 A | * | 4/1997 | Amanuma et al. .......... | 73/661 |
| 5,717,611 A | * | 2/1998 | Terui et al. ................ | 702/150 |
| 6,220,094 B1 | * | 4/2001 | Ichinose et al. ........... | 73/504.16 |
| 6,412,347 B1 | * | 7/2002 | Kuroda et al. ............. | 73/504.16 |
| 7,069,783 B2 | * | 7/2006 | Uehara ...................... | 73/514.12 |
| 7,355,631 B2 | * | 4/2008 | Kumaki .................... | 348/208.99 |
| 2003/0012565 A1 | | 1/2003 | Otani et al. | |

FOREIGN PATENT DOCUMENTS

| | | |
|---|---|---|
| JP | 05-207356 | 8/1993 |
| JP | 05-207356 A | 8/1993 |
| JP | 05-207356 A | 8/1993 |
| JP | 05-323436 A | 12/1993 |
| JP | 09-080509 A | 3/1997 |
| JP | 09-297028 A | 11/1997 |
| JP | 2002-243451 A | 8/2002 |

OTHER PUBLICATIONS

International Search Report for PCT/JP2007/056153 dated Jun. 12, 2007.
South Korea Office Action for Application No. 10-2008-7019414, Aug. 25, 2010, Panasonic Corporation.
Chinese Office Action for Application No. 200780011317.3., Jun. 12, 2010, Panasonic Corporation.
South Korea Office Action for Application No. 10-2010-7023742 (and citing JP 05-207356), Nov. 30, 2010, Panasonic Corporation.

* cited by examiner

*Primary Examiner* — Helen C. Kwok
(74) *Attorney, Agent, or Firm* — RatnerPrestia

(57) ABSTRACT

An inertial force sensor is provided in which each of switches is connected in parallel with each of resistors of low-pass filter and high-pass filter, respectively, and capacitor of high-pass filter can be boost charged by making switches on without mediate resistors.

4 Claims, 4 Drawing Sheets

INERTIA FORCE SENSOR

This application is a U.S. NATIONAL PHASE APPLICATION OF PCT INTERNATIONAL APPLICATION PCT/JP2007/056153.

TECHNICAL FIELD

The present invention relates to inertial force sensors for use in various electronic devices.

BACKGROUND ART

A description of a conventional inertial force sensor is given below taking angular velocity sensor as an example.

FIG. 6 is a circuit diagram of a sensory circuit of a conventional inertial force sensor. In FIG. 6, this angular velocity sensor comprises an oscillator (not shown) formed in various shapes such as tuning fork, letter H, letter T or tuning bar, a driver circuit (not shown) for driving the oscillator, sensory circuit 2 for sensing distortion produced in the oscillator due to Coriolis force (inertial force), and a power supply circuit (not shown) for supplying power to the driver circuit and the sensory circuit.

Sensory circuit 2 includes low-pass filter 8 and high-pass filter 10 formed by connecting resistor 4 and capacitor 6. An angular velocity signal is produced as an output by smoothing via low-pass filter 8 and high-pass filter 10 an electrical detected signal produced by the oscillator due to distortion.

Such an angular velocity sensor is mounted as a component of an image stabilizer of a digital camera, for example.

As related art information concerning the invention of this application, patent literature 1 and patent literature 2 are known, for example.

In the above configuration, normal angular velocity detection can not be performed until charging of capacitor 6 used in low-pass filter 8 and high-pass filter 10 of sensory circuit 2 is completed. Especially when an angular velocity sensor is employed in a digital camera, normal stabilizing function does not work immediately after the digital camera is turned on. Though there is a method of charging without a mediate resistor of a high-pass filter as disclosed in patent document 1, sufficient charging can not be performed by that alone.

Patent literature 1: Japanese Patent Unexamined Publication No. H05-207356

Patent literature 2: Japanese Patent Unexamined Publication No. 2002-243451

SUMMARY OF THE INVENTION

The present invention provides an inertial force sensor that can be fully charged and enables image stabilization immediately after activation when used in a digital camera and the like.

The inertial force sensor in accordance with the present invention comprises an oscillator for producing distortion due to an inertial force and a sensory circuit for outputting an angular velocity signal due to distortion after smoothing a detected signal delivered by the oscillator as an output. The sensory circuit comprises a low-pass filter and a high-pass filter each formed by connecting a resistor and a capacitor. One end of the capacitor of the high-pass filter is connected to between the resistor and the capacitor of the low-pass filter. An angular velocity signal is produced as an output after smoothing a detected signal through the low-pass filter and the high-pass filter. And a switch is connected in parallel with the resistor of either of the low-pass filter or the high-pass filter. At the same time, the capacitor can be charged by activating the switch thus bypassing the resistor.

Such configuration makes it possible to charge from either end of the capacitor and enables charging based on the selection as to whether to charge from the side of the low-pass filter or from the side of the high-pass filter as required. Especially when charging from one end of the capacitor, there occurs a case in which stable charging cannot be made because of an influence due to a load connected to the other end of the capacitor. However, as charging can be made from either end of the capacitor, stable charging is enabled. Accordingly, when used in a digital camera and the like, motion stabilization becomes functional immediately after being activated.

REFERENCE MARKS IN THE DRAWINGS

Figure 1:
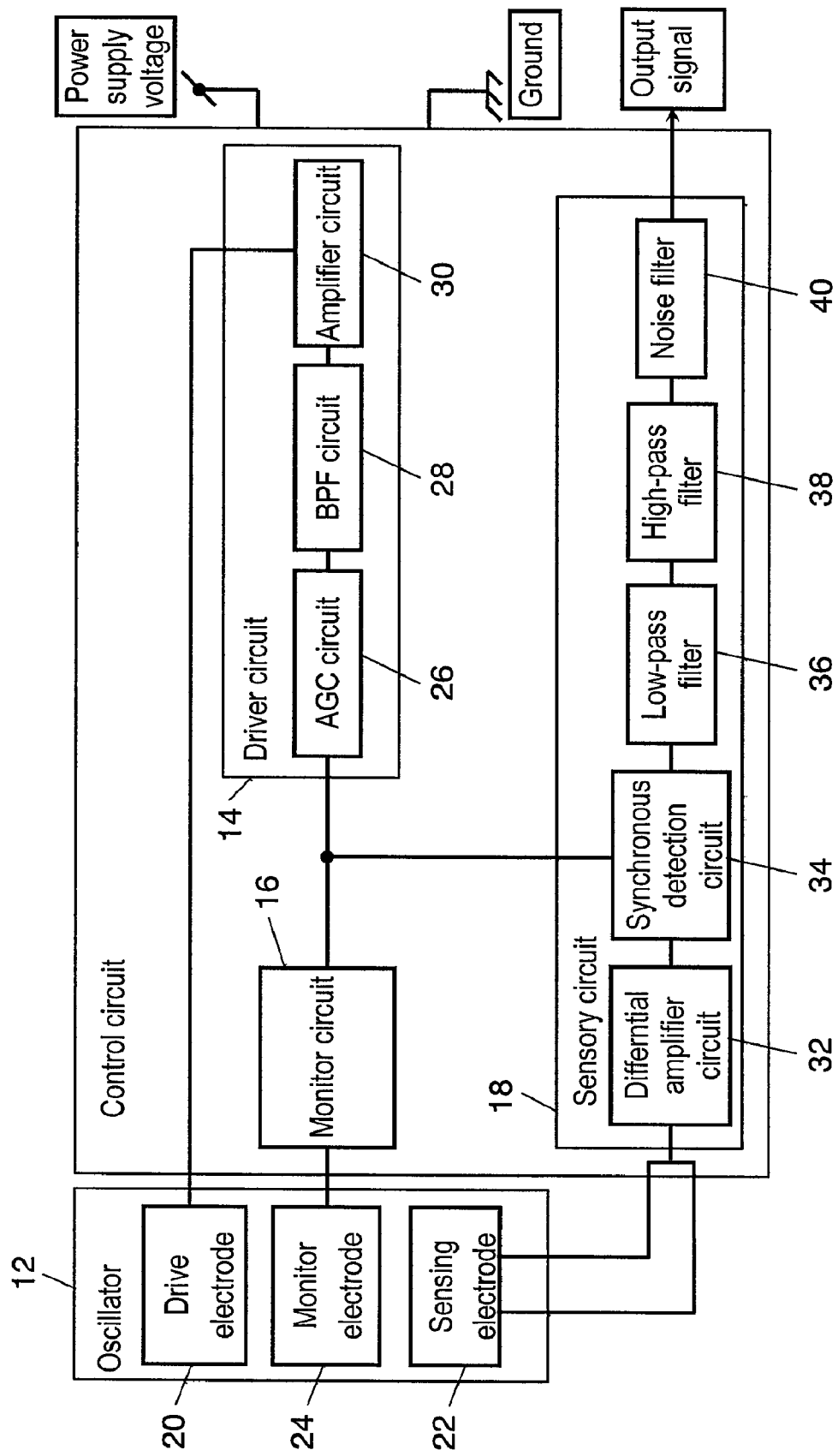
FIG. 1 is a block diagram of an angular velocity sensor in a preferred embodiment of the present invention.

12 Oscillator
14 Driver circuit
16 Monitor circuit
18 Sensory circuit
20 Drive electrode
22 Sensing electrode
24 Monitor electrode
26 AGC circuit
28 BPF circuit
30 Amplifier circuit
32 Differential amplifier circuit
34 Synchronous detection circuit
36 Low-pass filter
38 High-pass filter
40 Noise filter
42 First low-pass filter
44 Second low-pass filter
46, 62 Amplifier
48, 54 Resistor
50, 56 Capacitor
52 Second voltage
58 Third voltage
60 Fourth voltage
64, 66 Switch

DETAILED DESCRIPTION OF PREFERRED EMBODIMENT

Referring to drawings, description of an angular velocity sensor in an inertial force sensor in accordance with the preferred embodiment of the present invention will be given in the following.

Preferred Embodiment

FIG. 1 is a block diagram of an angular velocity sensor in a preferred embodiment of the present invention. In FIG. 1, the angular velocity sensor comprises oscillator 12, driver circuit 14 for oscillating the oscillator 12, monitor circuit 16 for monitoring the state of oscillation of oscillator 12, sensory circuit 18 for detecting distortion of oscillator 12 due to an inertial force (Coriolis force), and a power supply circuit (not shown) for supplying power to driver circuit 14 and sensory circuit 18. Oscillator 12 is formed by laying out multilayer drive electrode 20 formed by sandwiching a piezoelectric thin film of PZT between electrodes made of a metallic conductor such as Ag and Au, sensing electrode 22, and monitor electrode 24 on a silicon substrate in the shape of a tuning fork. Here, the shape of the silicon substrate can be like letter H, letter T, or tuning bar and the like.

Driver circuit 14 comprises AGC circuit 26 for controlling voltage, BPF circuit 28, and amplifier circuit 30 for amplifying the voltage to activate drive electrode 20. When monitor circuit 16 detects that the value of oscillation of oscillator 12 is small in view of the state of oscillation of oscillator 12, driver circuit 14 amplifies the voltage to energize oscillator 12 through AGC circuit 26. Conversely, when monitor circuit detects that the value of amplification of oscillator 12 is large, driver circuit 14 reduces the voltage for energizing oscillator 12 through AGC circuit 26. With such an action, the voltage for energizing oscillator 12 is controlled such that oscillator 12 oscillates with a certain cycle and amplitude.

Sensory circuit 18 detects distortion of oscillator 12 due to an inertial force and processes a detected signal as electrically output from sensing electrode 22. The two detected signals electrically put out from sensory electrode 22 are put out through differential amplifier circuit 32 and synchronous detection circuit 34. In addition, these detected signals are smoothed by low-pass filter 36, high-pass filter 38, and noise filter 40 and output as an angular velocity signal.

Figure 2:
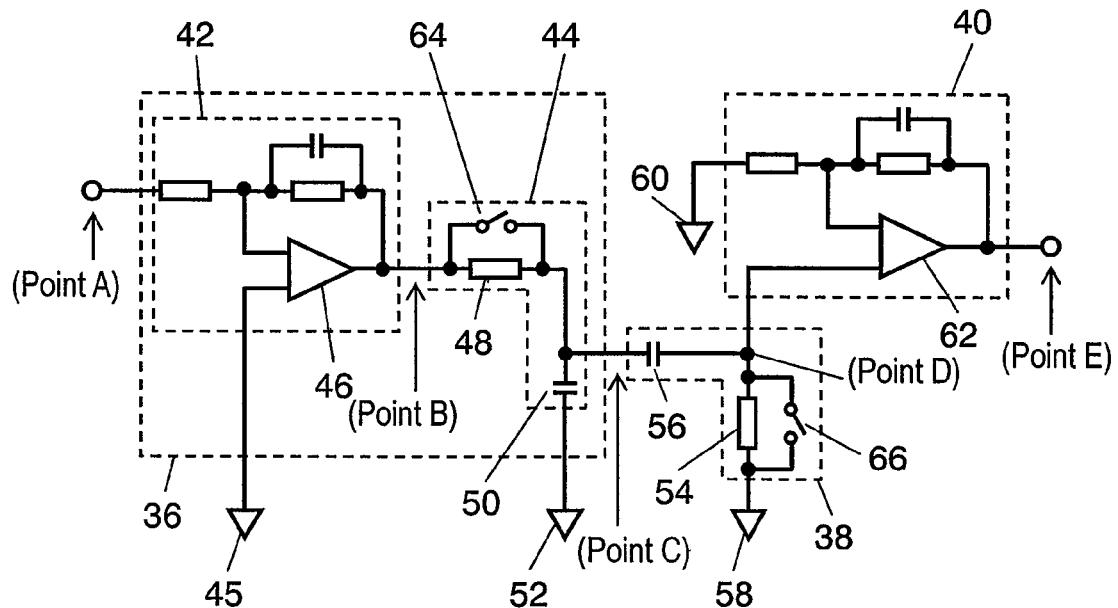
FIG. 2 is a circuit diagram of a sensory circuit of an angular velocity sensor in a preferred embodiment of the present invention.

FIG. 2 is a circuit diagram of a sensory circuit of an angular velocity sensor in a preferred embodiment of the present invention. As shown in FIG. 2, low-pass filter 36 is formed by connecting first low-pass filter 42 and second low-pass filter 44.

First low-pass filter 42 has amplifier 46 for outputting a filtered detected signal from an output terminal. A detected signal is input to a non-inverted input terminal of amplifier 46 through an input resistor. Also, first voltage 45 is applied to the non-inverted input terminal of amplifier 46.

Second low-pass filter 44 comprises resistor 48 and capacitor 50 that are connected in series. One end of resistor 48 is connected to output terminal of amplifier 46 and second voltage 52 is applied to one end of capacitor 50.

High-pass filter 38 is provided at the rear stage of low-pass filter 36. High-pass filter 38 has resistor 54 and capacitor 56 that are connected in series. One end of capacitor 56 of high-pass filter 38 is connected between resistor 48 and capacitor 50 of second low-pass filter 44. Also, third voltage 58 is applied to one end of resistor 54 of high-pass filter 38.

Noise filter 40 is provided at the rear stage of high-pass filter 38. Noise filter 40 includes amplifier 62 for putting out filtered detected signal from the output terminal. A detected signal put out from between resistor 54 and capacitor 56 of high-pass filter 38 is fed to a non-inverted input terminal of amplifier 62. Also, fourth voltage 60 is applied to the non-inverted input terminal of amplifier 62 through an input resistor.

Here, if we compare capacitor 50 of second low-pass filter 44 and capacitor 56 of high-pass filter 38, the capacitance of capacitor 56 of high-pass filter 38 is about ten times larger and requires longer time for charging. Accordingly, the inertial force sensor in accordance with the present invention is provided with a charging means in which capacitor 56 of high-pass filter 38 can be boost charged.

That is, switches 64, 66 are connected in parallel with resistors 48, 54 of low-pass filter 36 and high-pass filter 38, respectively, and capacitor 56 of high-pass filter 38 is charged by activating switches 64, 66 without passing through resistors 48, 54. In addition, the voltage value of fourth voltage 60 to be applied to inverted input terminal of amplifier 62 of noise filter 40 and the voltage value of third voltage 58 to be applied to one end of resistor 54 of high-pass filter 38 are made equal. With such a configuration, boost charging of capacitor 56 becomes possible.

Furthermore, in FIG. 2, a switch (not shown) may be inserted in series at each end of capacitor 56 of high-pass filter 38. In the case of such a configuration, charging and discharging of capacitor 56 is stopped by making the switches on both ends off. Accordingly, by making capacitor 56 in a charged state in advance, the charged state can be maintained for a certain period of time.

And, by maintaining the charged state of capacitor 56 for a certain period of time, the value of output voltage at point E can be stabilized in an early stage. For example, suppose that one of the two switches connected to both ends of capacitor 56 is connected to a front stage circuit while the other switch is connected to a rear stage circuit. Here, the front stage circuit is high-pass filter 38 and the rear stage circuit is noise filter 40. At this time, supply of power to the front stage circuit or the rear stage circuit is stopped by making these two switches off. Capacitor 56 maintains the charged state of the moment the two switches are made off. Later on, by making the two switches on, as capacitor 56 discharges to the front stage circuit or to the rear stage circuit, the voltage values at point C and point D quickly stabilizes.

Also, by providing switches for stopping power supply to amplifiers 46, 62, and second voltage 52, third voltage 58, and fourth voltage 60, early stabilization of output voltage value at point E may be further attained.

Figure 3:
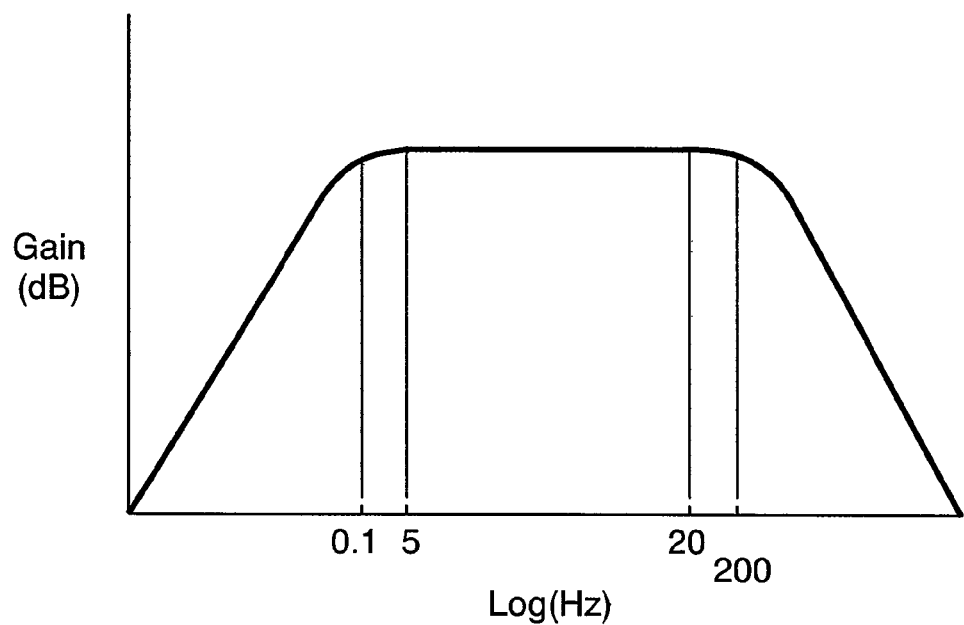
FIG. 3 is a characteristic waveform diagram showing gain as a function of image stabilization frequency.

FIG. 3 is a characteristic waveform diagram showing gain as a function of image instability frequency. In FIG. 3, when above-described angular velocity sensor is employed in an image stabilizer mechanism of a digital camera, image instability occurs in the frequency range of around 5 to 20 Hz. Consequently, gain in the 5 to 20 Hz range is kept from attenuating by means of above-described low-pass filter 36 and high-pass filter 38. When taking influence of noises into consideration, it is preferable to keep the gain in the 0.1 to 200 Hz range from attenuating.

Figure 4:
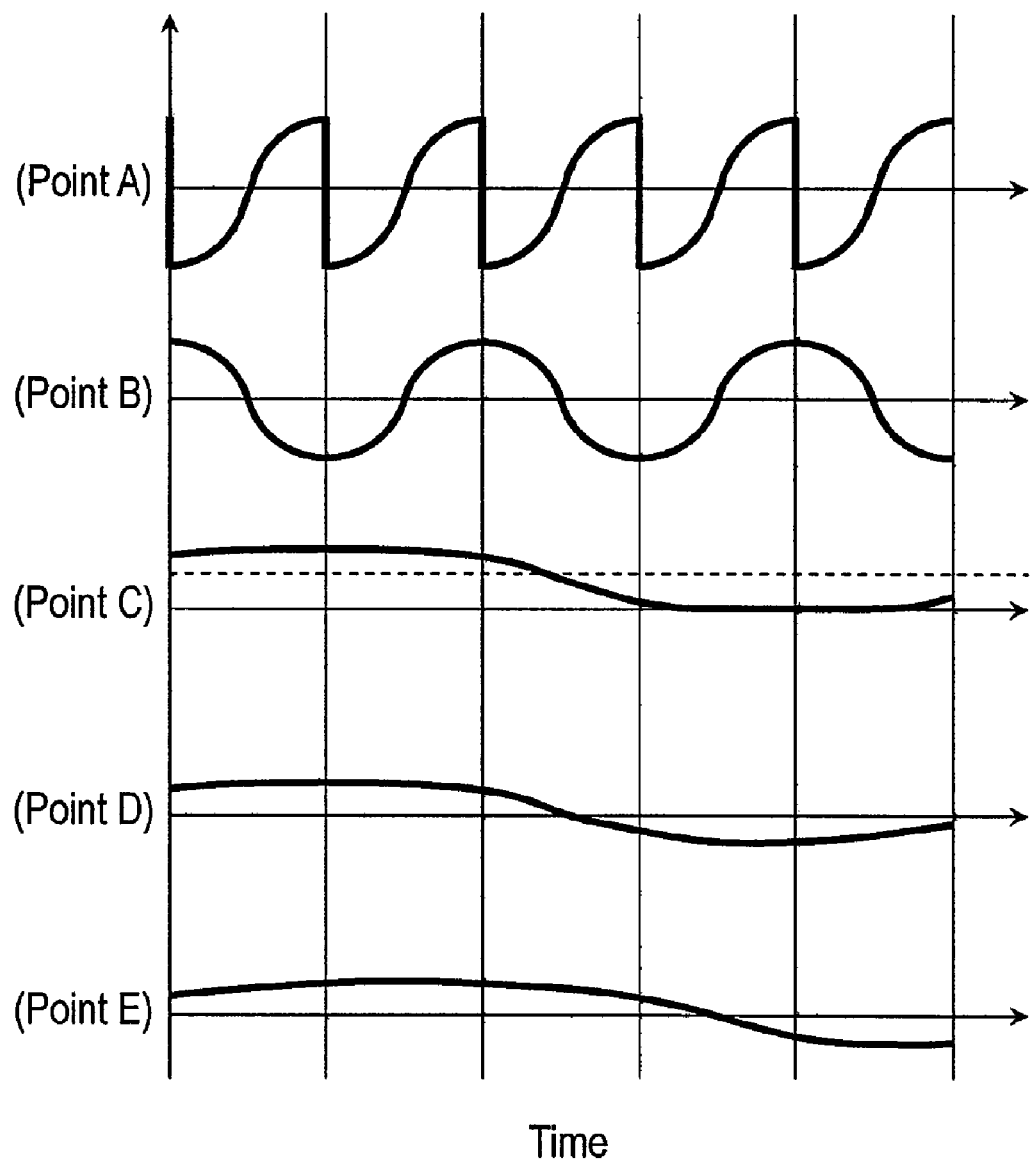
FIG. 4 is a characteristic waveform diagram showing characteristic waveforms at points A to E in FIG. 2.

FIG. 4 is a characteristic waveform diagram showing characteristic waveforms at points A to E shown in FIG. 2. The waveforms show characteristic waveforms at each point until an angular velocity signal is output after smoothing the detected signals.

The detected signal inputted at point A is a periodic signal obtained by detecting sine-wave signals generated by oscillator 12. This detected signal is reversed by amplifier 46 and turns into a waveform shown by point B in FIG. 4. Subsequently, smoothing operation is performed and a signal indicating angular velocity is output at point E after passing points C and D.

By adopting the above configuration, switches 64, 66 are connected in parallel with at least one of resistors 48, 54 of low-pass filter 36 and high-pass-filter 38 and, at the same time, capacitor 56 is charged by making switches 64, 66 on without mediate resistors 48, 54. This action enables charging of capacitor 56 from either end. Accordingly, charging can be made from the side of low-pass filter 36 or from the side of high-pass filter 38 as deemed necessary based on selection.

Especially when charging from one end out of both ends of capacitor 56, there occurs a case in which stable charging cannot be made due to influence of a load connected to the other end. However, with the inertial force sensor in accordance with the present invention, stable charging is possible as charging can be made from either end of capacitor 56.

As is described above, stable boost charging becomes possible by connecting switches 64, 66 in series with both of resistors 48, 54 of low-pass filter 36 and high-pass filter 38, respectively, and by charging capacitor 56 of high-pass filter 38 without mediate resistors 48, 56 by making switches 64, 66 on.

Figure 5:
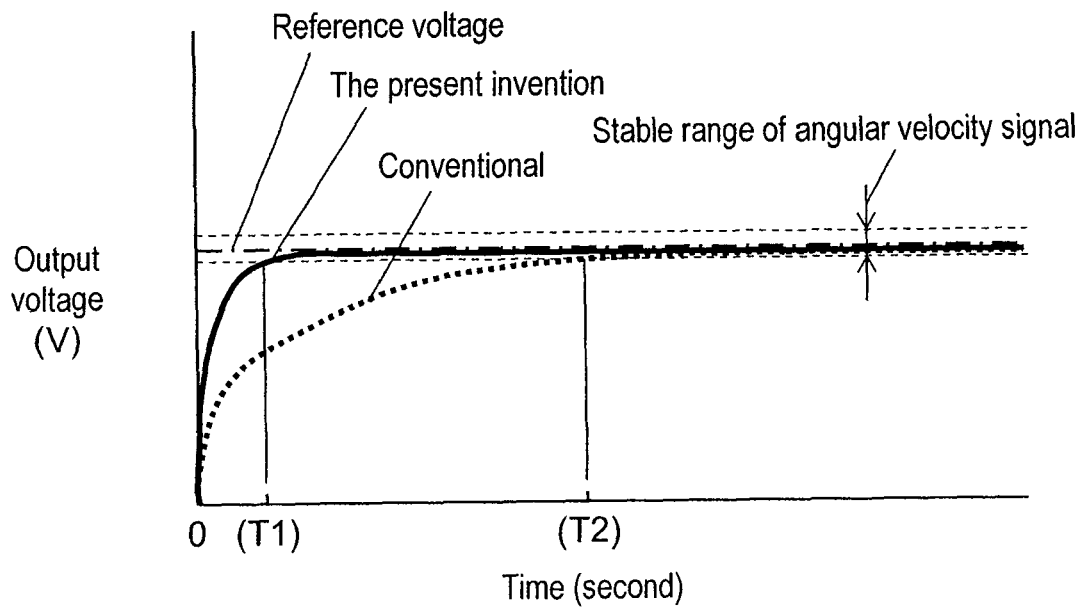
FIG. 5 is a characteristic waveform diagram showing the time until stabilized range of angular velocity signal is reached.
Figure 6:
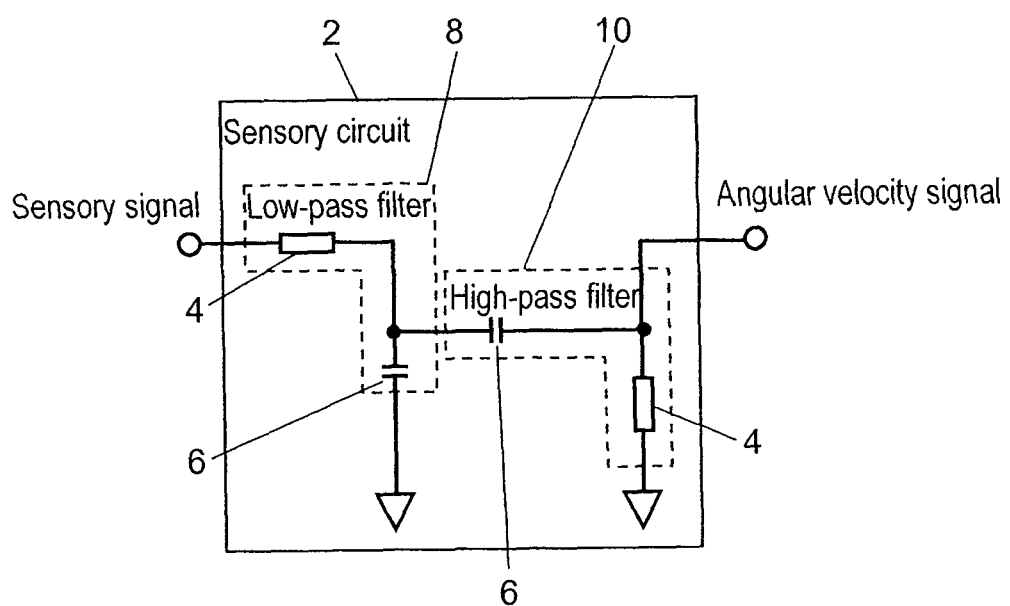
FIG. 6 is a circuit diagram of a sensory circuit of a conventional inertial force sensor.

FIG. 5 is a characteristic waveform diagram showing the time necessary until an angular velocity signal reaches a stable range where normal detection of the angular velocity can be made. This diagram shows angular velocity signal in terms of the output voltage at point E of FIG. 4 as a function of time. Also, the middle point of the dynamic range of amplifier 62 is used as the reference voltage. Here, the stable range is the range in which the voltage approaches a fixed range from the reference voltage.

As shown in FIG. 5, the time (T1) until reaching the stable range of angular velocity signal in accordance with the present invention is shorter than the time (T2) until angular velocity signal reaches a stable range in a conventional method. While conventional method used to take several seconds to several tens of seconds until reaching a stable range of angular velocity signal, a stable range is reached in a second or below according to the present invention.

Also, as fourth voltage 60 to be applied to inverted input terminal of amplifier 62 of noise filter 40 and third voltage 58 to be applied to one end of capacitor 56 of high-pass filter 38 are made equivalent, superimposition of a noise signal into the angular velocity signal in amplifier 62 can be especially suppressed. Accordingly, even when used in a digital camera and the like, image stabilization becomes functional immediately after activation.

INDUSTRIAL APPLICABILITY

As is described above, as the inertial force sensor in accordance with the present invention allows boost charging of a capacitor of a high-pass filter used in a sensory circuit, it is useful in a variety of electronic devices.

The invention claimed is:

1. An inertial force sensor comprising:
   an oscillator and a sensory circuit for outputting an angular velocity signal after smoothing a detected signal outputted by the oscillator; wherein
   the sensory circuit has a low-pass filter and a high-pass filter formed by connecting a resistor and a capacitor;
   one end of the capacitor of the high-pass filter is connected to between the resistor and the capacitor of the low-pass filter;
   an angular velocity signal is outputted after smoothing the detected signal through the low-pass filter and the high-pass filter; and
   switches are respectively connected in parallel with the resistor of the low-pass filter and the resistor of the high-pass filter, and the capacitor of the high-pass filter is charged by making one or both of the switches on.

2. The inertial force sensor of claim 1 wherein:
   the sensory circuit further comprises a noise filter;
   the angular velocity signal to be outputted by the high-pass filter is outputted through the noise filter;
   the noise filter has an amplifier;
   the angular velocity signal is inputted to a non-inverted input terminal of the amplifier;
   a voltage is applied to an inverted input terminal of the amplifier through an input resistor;
   the angular velocity signal is outputted from an output terminal of the amplifier after being amplified; and
   a voltage equivalent to the voltage applied to the inverted input terminal of the amplifier is applied to one end of the capacitor of the high-pass filter.

3. The inertial force sensor of claim 1 wherein:
   the switches are provided at both ends of the capacitor of the high-pass filter; and
   a front stage circuit and a rear stage circuit are connected through the switches.

4. The inertial force sensor of claim 3 further having a function of suspending supply of power to the front stage circuit or the rear stage circuit.

* * * * *